US00RE47264E

(19) United States
(12) Reissued Patent
Kim et al.

(10) Patent Number: US RE47,264 E
(45) Date of Reissued Patent: *Mar. 5, 2019

(54) CHARGING DEVICE OF ROBOT CLEANER

(71) Applicant: LG ELECTRONICS INC., Seoul (KR)

(72) Inventors: Bong-Ju Kim, Changwon-si (KR); In-Bo Shim, Changwon-si (KR); Ji-Hoon Sung, Changwon-si (KR); Byung-Doo Yim, Changwon-si (KR); Sung-Guen Kim, Changwon-si (KR)

(73) Assignee: LG ELECTRONICS INC., Seoul (KR)

( * ) Notice: This patent is subject to a terminal disclaimer.

(21) Appl. No.: 14/864,563

(22) Filed: Sep. 24, 2015

Related U.S. Patent Documents

Reissue of:
(64) Patent No.: 8,825,256
Issued: Sep. 2, 2014
Appl. No.: 13/379,753
PCT Filed: Jun. 30, 2009
PCT No.: PCT/KR2009/003560
§ 371 (c)(1),
(2) Date: Dec. 21, 2011
PCT Pub. No.: WO2011/002112
PCT Pub. Date: Jan. 6, 2011

(51) Int. Cl.
*A47L 9/28* (2006.01)
*G05D 1/02* (2006.01)
(Continued)

(52) U.S. Cl.
CPC ..... *A47L 9/2873* (2013.01); *A47L 9/2831* (2013.01); *A47L 9/2852* (2013.01); *A47L 9/2894* (2013.01);
(Continued)

(58) Field of Classification Search
CPC .... A47L 9/2831; A47L 9/2852; A47L 9/2873; A47L 9/2894
See application file for complete search history.

(56) References Cited

U.S. PATENT DOCUMENTS 3,784,836 A * 1/1974 Tolliver ..... 250/495.1
4,327,972 A * 5/1982 Brunsting ..... 362/335
(Continued)

FOREIGN PATENT DOCUMENTS

GB 2062282 A 5/1981
GB 2248141 A * 3/1992 ..... H01K 7/00
(Continued)

OTHER PUBLICATIONS

International Search Report, International Application PCT/KR2009/003560; Mar. 17, 2010.*
(Continued)

*Primary Examiner* — Luke S Wassum
(74) *Attorney, Agent, or Firm* — Dentons US LLP

(57) ABSTRACT

A charging device of a robot cleaner is provided. The charging device of a robot cleaner according to the embodiment includes at least one cover forming an appearance of the charging device, a base which is coupled with the cover and includes a terminal unit for charging the robot cleaner, an induction signal generating unit disposed at a side of the cover or the base to transmit a return induction signal to the robot cleaner, and an induction signal guide member disposed at a side of the induction signal generating unit to enhance a docking performance of the robot cleaner by improving linearity of the induction signal. The charging device according to the embodiment can guide the path for the return of the robot cleaner and recharge the robot cleaner stably.

13 Claims, 6 Drawing Sheets

(51) Int. Cl.

| | |
|---|---|
| ***H02J 7/00*** | (2006.01) |
| ***G02B 19/00*** | (2006.01) |
| ***G02B 27/00*** | (2006.01) |
| ***G02B 27/09*** | (2006.01) |

(52) U.S. Cl.

CPC ..... *G05D 1/0225* (2013.01); *G05D 1/0242* (2013.01); *A47L 2201/02* (2013.01); *A47L 2201/022* (2013.01); *G02B 19/0061* (2013.01); *G02B 27/0018* (2013.01); *G02B 27/0988* (2013.01); *G05D 2201/0215* (2013.01); *H02J 7/0042* (2013.01)

(56) References Cited

U.S. PATENT DOCUMENTS

| | | | | |
|---|---|---|---|---|
| 4,679,152 | A * | 7/1987 | Perdue | 701/23 |
| 6,389,329 | B1 * | 5/2002 | Colens | 700/262 |
| 7,053,578 | B2 * | 5/2006 | Diehl et al. | 318/568.12 |
| 7,397,213 | B2 * | 7/2008 | Im et al. | 318/568.12 |
| 7,489,985 | B2 * | 2/2009 | Ko et al. | 700/259 |
| 7,615,957 | B2 * | 11/2009 | Kim et al. | 318/568.12 |
| 7,729,803 | B2 * | 6/2010 | Lim et al. | 700/245 |
| 8,380,350 | B2 * | 2/2013 | Ozick et al. | A47L 5/30 700/250 |
| 9,134,733 | B2 * | 9/2015 | Yoo | G05D 1/0225 |
| 9,851,711 | B2 * | 12/2017 | Yoo | G05B 19/416 |
| 2007/0233319 | A1 * | 10/2007 | Im et al. | G05D 1/0225 700/245 |
| 2007/0244610 | A1 * | 10/2007 | Ozick | A47L 5/30 701/23 |
| 2008/0065266 | A1 * | 3/2008 | Kim | 700/245 |
| 2008/0136668 | A1 * | 6/2008 | Song et al. | 340/870.11 |
| 2008/0174268 | A1 * | 7/2008 | Koo | A47L 9/2805 320/109 |
| 2012/0143428 | A1 * | 6/2012 | Kim | A47L 9/2831 701/23 |

FOREIGN PATENT DOCUMENTS

| | | | | |
|---|---|---|---|---|
| KR | 10-2001-0032583 | A | 4/2001 | |
| KR | 10-2006-0037008 | A | 5/2006 | |
| KR | 10-0645381 | B1 * | 11/2006 | |
| KR | 10-0820585 | B1 * | 4/2008 | B25J 13/00 |
| KR | 10-2008-051936 | A | 6/2008 | |
| WO | 9205411 | A1 | 4/1992 | |
| WO | 2004-006034 | A2 | 1/2004 | |

OTHER PUBLICATIONS

International Chapter 1 Report on Patentability, International Application PCT/KR2009/003560, Jan. 17, 2012.*

Eurpoean Search Report, EPO Application EP-09 84 6851, Apr. 23, 2015.*

EPO Search Opinion, EPO Application EP-09 846 851.5, May 4, 2015.*

Eurpoean Search Report, EPO Application EP-15 18 4935, Dec. 14, 2015.*

EPO Search Opinion, EPO Application EP-15 184 935.3, Dec. 22, 2015.*

European Search Report, EPO Application EP-15 17 9575, Feb. 15, 2016.*

EPO Search Opinion, EPO Application EP-15 179 575.4, Feb. 23, 2016.*

* cited by examiner

CHARGING DEVICE OF ROBOT CLEANER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*More than one reissue application has been filed for the reissue of U.S. Pat. No. 8,825,256. The reissue applications are application Ser. No. 14/864,563 (the present application), and Ser. No. 14/965,286 (a continuing reissue of the present application). This application is a reissue of, and claims the benefit of, U.S. Pat. No. 8,825,256, issued on Sep. 2, 2014, which is a 35 U.S.C. § 371 National Stage Entry of International Application No. PCT/KR2009/003560 filed on Jun. 30, 2009.*

BACKGROUND

The present disclosure relates to a charging device of a robot cleaner.

A general robot cleaner moves within a certain area on its own and without user control to remove dust and foreign substances from the floor of the area. The robot cleaner uses a sensor or a camera to locate walls and obstacles, and cleans up the area avoiding the walls and obstacles by using the data obtained by the sensor or the camera.

For the abovementioned purpose, the robot cleaner has to be equipped with a battery which supplies power to move the robot cleaner. Usually, when used up, the battery is recharged for reuse.

Therefore, the robot cleaner has to be provided to its user along with a charging device, which has the function of return induction signal generation so that the robot cleaner with a dead battery can return to the charging device for recharging.

When receiving the return induction signal generated by the charging device, the robot cleaner moves toward the charging device by following the return induction signal.

After approaching the charging device, the robot cleaner docks with the charging device so that the power supply terminal is connected to the charging terminal of the charging device. Once the docking is completed, power is supplied through the charging terminal to charge the battery of the robot cleaner.

In order for the robot cleaner to be charged effectively, the power supply terminal of the robot cleaner and the charging terminal of the charging device have to be connected accurately to each other. To that end, the docking path has to be guided without inaccuracy.

Further, the contact force between the power supply and charging terminals needs to be increased because the charging can be carried out effectively only when the terminals remain in tight contact with each other.

SUMMARY

Embodiments provide a charging device of a robot cleaner which guides a return induction signal accurately to a robot cleaner.

Embodiments also provide a charging device of a robot cleaner which allows a power terminal of a robot cleaner in docking with the charging device and a charging terminal of the charging device to remain in tight contact with each other.

In one embodiment, a charging device of a robot cleaner includes: at least one cover defining an appearance of the charging device; a base which is coupled with the cover and includes a terminal unit for charging the robot cleaner; an induction signal generating unit disposed at a side of the cover or the base to transmit a return induction signal to the robot cleaner; and an induction signal guide member disposed at a side of the induction signal generating unit to enhance a docking performance of the robot cleaner by improving linearity of the induction signal.

The details of one or more embodiments are set forth in the accompanying drawings and the description below. Other features will be apparent from the description and drawings, and from the claims.

DETAILED DESCRIPTION OF THE EMBODIMENTS

A charging device of a robot cleaner according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Figure 1:
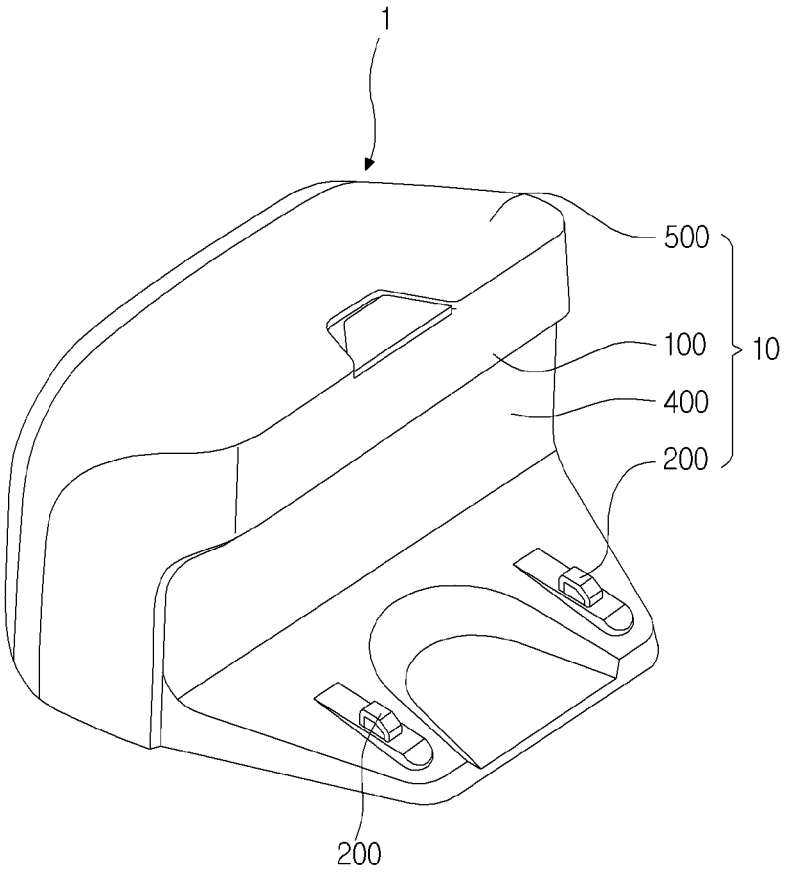
FIG. 1 is a view illustrating an appearance of a charging device of a robot cleaner according to an embodiment.
Figure 2:
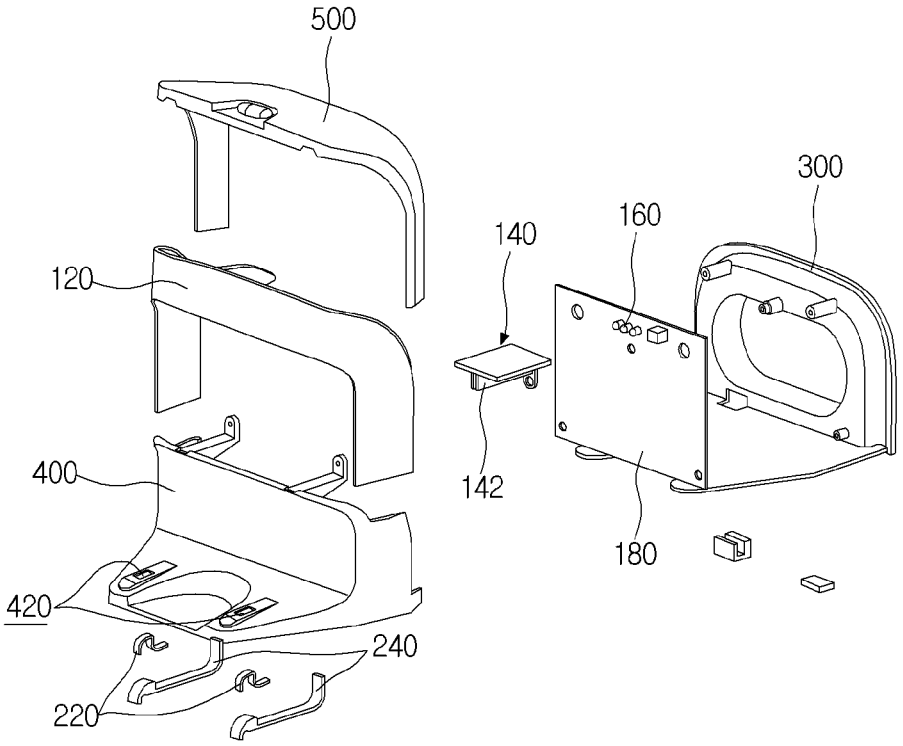
FIG. 2 is an exploded perspective view illustrating the charging device of a robot cleaner according to an embodiment.

FIG. 1 is a view illustrating an appearance of a charging device of a robot cleaner according to an embodiment, and FIG. 2 is an exploded perspective view illustrating the charging device of a robot cleaner according to the embodiment.

As illustrated in the drawings, a robot cleaner charging device 1 according to an embodiment includes a main body 10. The main body 10 includes a base 300, a front cover 400, a return induction unit 100, and an upper cover 500, which are described hereinafter.

The base 300 forms rear and bottom surfaces of the charging device 1, and provides a space where a terminal unit 200 described hereinafter and the return induction unit 100 are installed.

Although not illustrated, the base 300 may include a coupling portion where at least the return induction unit 100 and the terminal unit 200 may be assembled or tentatively assembled. A portion of the return induction unit 100 or the terminal unit 200 may be coupled with the coupling portion via insertion or a coupling member.

The terminal unit 200 supplies power to a robot cleaner by using a power source such as a commercial power source or a battery and, if necessary, through a conversion process to meet a working voltage of the robot cleaner.

Therefore, the terminal unit 200 includes a converter (not illustrated) for voltage conversion, and power supplied from the converter is transmitted to a charging terminal 220 described hereinafter.

The charging terminal 220 comes into contact with a power terminal of the robot cleaner to supply charging power to the robot cleaner, and is formed by bending a conductor with a low level of electric resistance, such as copper, several times.

The charging terminal 220 formed through the bending process is installed such that at least a portion may be exposed outside the front cover 400 which is coupled with a front side of the base 300. To that end, a terminal supporting member 240 is disposed at the front cover 400 to support the charging terminal 220 between the base 300 and the front cover 400.

Figure 3:
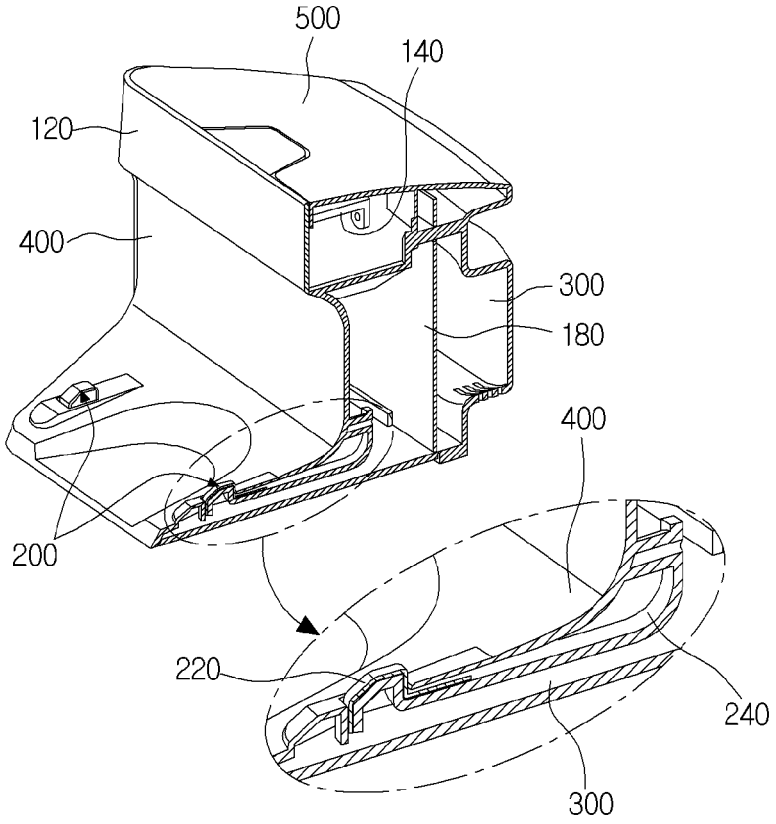
FIG. 3 is a view illustrating a terminal unit of the charging device of a robot cleaner according to an embodiment.

FIG. 3 is a view illustrating the terminal unit of the robot cleaner charging device according to the embodiment.

As illustrated in the drawing, the terminal supporting member 240 is formed by plastic injection molding, through which a side of the terminal supporting member 400 coming into contact with the charging terminal 220 can have a shape corresponding to a bent portion of the charging terminal 220.

The other side extends far backwards from the side coming into contact with the charging terminal 220, and then, is bent upwards to be coupled with a rear surface of the front cover 400.

When the exposed portion of the front cover 400 is applied with pressure by coming into contact with the power terminal of the robot cleaner, the charging terminal 220 is elastically supported by a material and shape of the terminal supporting member 240 and, therefore, the charging terminal 220 and the power terminal can remain in tight contact with each other.

An upper portion of the front cover 400 has a shape corresponding to a shape of a side surface of the robot cleaner, and a lower portion of the front cover 400, which is disposed at a lower portion of the robot cleaner, extends far forward so that the power terminal and the charging terminal 220 can be connected to each other.

A terminal exposure hole 420 is formed at the lower portion of the front cover 400 so that the bent portion of the charging terminal 220 can be exposed, and a side portion of the front cover 400 which extends backwards from the upper and lower portions provides a space where a return induction unit cover 120 described hereinafter and the upper cover 500 can be installed.

The return induction unit cover 120, which covers the side portion of the front cover 400 in part, is inserted into the front cover 400. When the insertion is completed, a front surface of the return induction unit cover 120 is disposed at the upper portion of the front cover 400.

The return induction unit cover 120 installed at the above-mentioned position is formed of a transparent or semi-transparent material so that a return induction signal, which is transmitted by an induction signal generating unit 160 described hereinafter, can penetrate the return induction unit cover 120.

The induction signal generating unit 160, which is a group of infrared light emitting units, leads the robot cleaner to return to the charging device following a transmitted infrared signal. The induction signal generating unit 160 is inserted into a printed circuit board 180 between the base 300 and the front cover 400, and disposed at a rear side of the return induction unit cover 120.

An induction signal guide member 140 is further disposed between the induction signal generating unit 160 and the return induction unit cover 120 to improve linearity of the return induction signal by limiting a transmission angle of the return induction signal transmitted by the induction signal generating unit 160.

Figure 4:
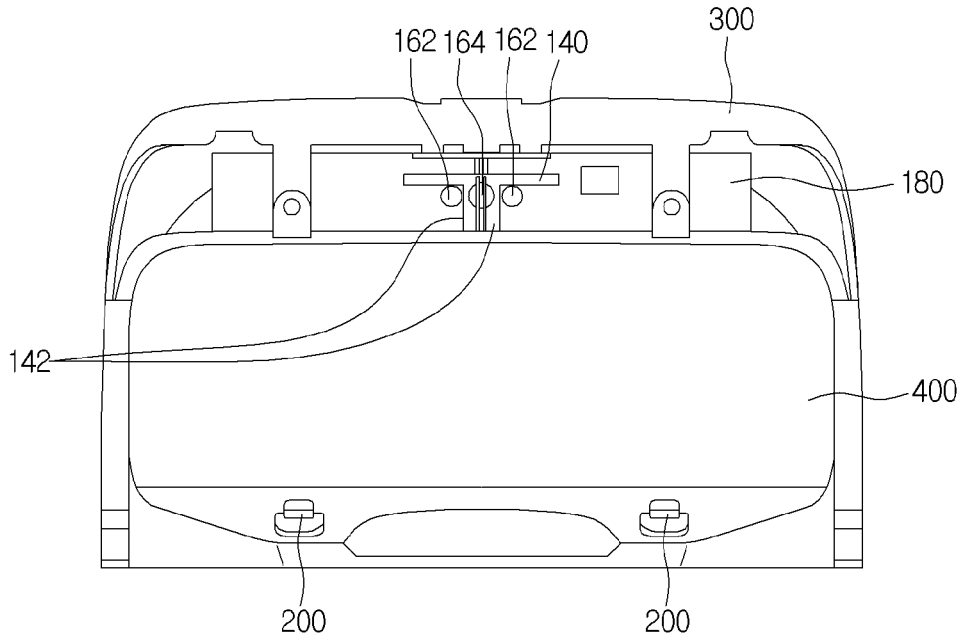
FIG. 4 is a view illustrating a state in which an induction signal guide member that is a main component is installed according to an embodiment.
Figure 5:
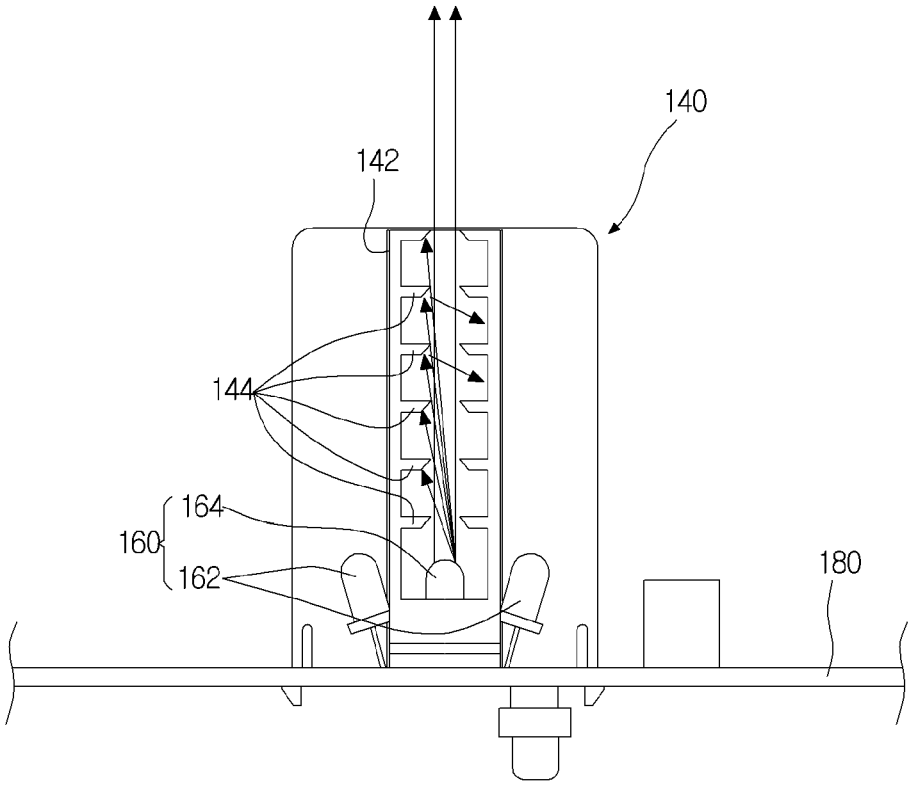
FIG. 5 is a bottom view illustrating a state in which the induction signal guide member of FIG. 4 is installed.

FIG. 4 is a view illustrating a state in which the induction signal guide member that is a main component is installed according to the embodiment, and FIG. 5 is a bottom view illustrating a state in which the induction signal guide member of FIG. 4 is installed.

As illustrated in the drawings, the induction signal generating unit 160 includes access induction light emitting units 162 which transmit an infrared signal to lead the robot cleaner in a remote location to the charging device 1, and a docking induction light emitting unit 164 leading the robot cleaner to a docking position when the robot cleaner is moved close to the charging device 1 by the access induction light emitting units 162.

One or more access induction light emitting units 162 may be disposed at each of both sides, and one or more docking induction light emitting units 164 may be disposed between the access induction light emitting units 162.

The induction signal guide member 140, which may have a T shape, limit the transmission angle of the signal transmitted by the docking induction light emitting unit 164 and the access induction light emitting unit 162.

In a state when the induction signal guide member 140 is installed at the printed circuit board 180, the induction signal guide member 140 protrudes forward, i.e., in a direction of a guiding signal transmitted by the induction signal generating unit 160 as illustrated in FIG. 5. The length of the protrusion is equivalent to the distance between the printed circuit board 180 and the return induction unit cover 120 installed at the front cover 400.

Disposed at a center of the induction signal guide member 140 is a guide 142, which surrounds the docking induction light emitting unit 164 and has a front opening.

Therefore, a docking induction signal transmitted outside from the docking induction light emitting unit 164 can be transmitted only through the front opening of the guide 142.

Disposed in the guide 142 are a plurality of reflection units 144 to further improve the linearity by limiting the transmission angle of the docking induction signal transmitted through the front opening. The reflection unit 144 may have a shape of an inwardly protruding plate or projection.

The reflection unit 144 protrudes inwardly from an inner left side or an inner right side of the guide 142. The reflection units 144 form a series of layers including at least end and central portions of the guide 142 and the vicinity of the docking induction light emitting unit 164.

In other words, the reflection units 144 protrude inwardly from both inner sides of the guide 142, and ends of the reflection units 144 facing each other are disposed away from each other at a predetermined distance.

Therefore, a pair of the reflection units 144 facing each other form a layer, and the layer has a central opening to provide an optical path to the light transmitted by the docking induction light emitting unit 164.

The opening between the reflection units 144 formed in the abovementioned manner is formed on the same line as the docking induction light emitting unit 164.

Therefore, the docking induction signal transmitted by the docking induction light emitting unit 164 can pass through the opening between the reflection units 144 only when the transmission angle toward the opening is relatively narrow. When the transmission angle is relatively wide, the signal is blocked by the reflection units 144 and the transmission is blocked.

Since the reflection unit 144 has a predetermined thickness, the docking induction signal transmitted toward a side of the reflection unit 144 may be transmitted outside the guide 142 bumping into and reflected by the end of the reflection unit 144. To prevent the phenomenon, the end of the reflection unit 144 slopes.

The end of each of the reflection units 144 slopes toward the opened front side of the guide 142.

In other words, a surface of the reflection unit 144 toward the opened front side of the guide 142 is longer than a surface of the reflection unit 144 toward the docking induction light emitting unit 164 so that the side of the reflection unit 144 slopes.

The docking induction signal which is transmitted toward the slope of the end is not transmitted outside but blocked inside the guide 142 because the reflection angle is toward the docking induction light emitting unit 164.

Therefore, the signal which is transmitted outside the guide 142 has a relatively narrow transmission angle. To receive the signal, the robot cleaner moves to an area where the return signals transmitted by the access induction light emitting units 162 interact and then receives the docking induction signal.

Figure 6:
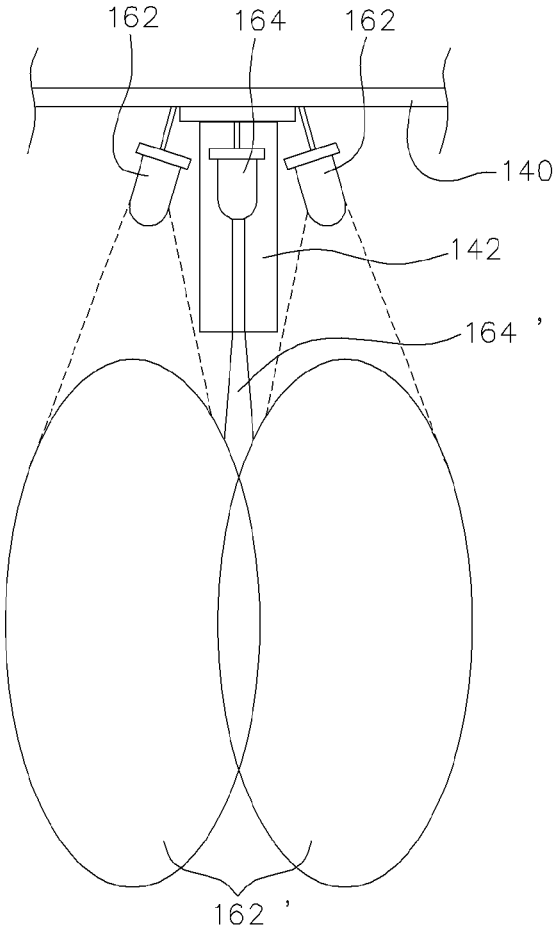
FIG. 6 is a view illustrating an area of an induction signal generated by the charging device of a robot cleaner according to an embodiment.

Illustrated in FIG. 6 for detailed description is the area of the induction signals generated by the charging device according to the embodiment.

As illustrated in the drawing, the signals transmitted by the return induction unit 100 toward the robot cleaner include the return induction signal to guide the robot cleaner toward the charging device 1 by using the access induction light emitting units 162 and the docking induction signal to lead the robot cleaner and the charging device 1 for docking by using the docking induction light emitting unit 164.

In guiding the robot cleaner to the charging device, the return induction signal controls rotation of wheels of the robot cleaner in accordance with the direction of transmission, and reduces the distance of the robot cleaner moving sideways.

To this end, the access induction light emitting unit 162 is provided in plurality, with the docking induction light emitting unit 164 disposed between the access induction light emitting units 162, and the access induction light emitting units 162 transmit the return induction signals at a relatively wide angle. Therefore, access induction areas 162' where the access induction light emitting units 162 guide the robot cleaner to return may overlap in part as illustrated in FIG. 5.

Meanwhile, the docking induction signal guides the robot cleaner to allow the robot cleaner to dock with the charging device and the power terminal to come into contact with the charging terminal 220.

The docking induction signal transmitted outside by the docking induction light emitting unit 164 having the abovementioned purpose has a limited transmission angle because of the induction signal guide member 140.

In other words, the guide 142 and the reflection plate 144 block the docking induction signal having a wide transmission angle while exposing the docking induction signal have a narrow transmission angle, and a docking induction area 164' thereby has a relatively very narrow width.

The docking induction area 164' may be disposed toward the overlapped part of the access induction areas 162' with the docking induction light emitting unit 164 and the guide 142 disposed between the access induction light emitting units 162.

Returning to the charging device heading toward the overlapped part of the access induction areas 162', the robot cleaner approaches the docking induction area 164'. After approaching the docking induction area 164', the robot cleaner is guided by the docking induction signal and moved to the charging device.

Here, the narrow transmission angle of the docking induction signal reduces the lateral distance of the robot cleaner moving on the path to the charging device.

Since the lateral movement of the robot cleaner is reduced during the docking process, the docking accuracy can increase.

Described hereinafter is the process in which the robot cleaner returns to the charging device 1 having the abovementioned structure.

When the battery of the robot cleaner runs out while the robot cleaner moves in a pre-set cleaning area carrying out cleaning or when the cleaning is completed, the robot cleaner returns to the charging device 1 to recharge the battery.

For the purpose, the robot cleaner transmits a signal to the charging device 1 when the battery runs out or the cleaning is completed, requesting return induction, and the signal is received by the return induction unit 100 of the charging device 1.

When the signal from the robot cleaner is received, the charging device 1 transmits the return induction signal through the access induction light emitting unit 162 which constitutes a part of the induction signal generating unit 160. The robot cleaner, detecting the return induction signal, moves toward the charging device 1 following the return induction signal.

During the abovementioned process, the rotation of the wheels of the robot cleaner is controlled, in accordance with the direction of the received return induction signal, i.e., the position of the access induction light emitting unit 162 which forms the access induction area 162', so that the robot cleaner can move to the overlapped part of the access induction areas 162' generated by the access induction light emitting unit 162.

When the robot cleaner reaches the overlapped part of the access induction areas 162', the robot cleaner moves to the charging device 1 following a docking guide signal transmitted by the docking induction light emitting unit 164.

Here, the transmission angle of the docking guide signal transmitted by the docking induction light emitting unit 164 is limited by the induction signal guide member 140, and the width of the docking induction area 164' is narrowed.

Therefore, the lateral movement of the robot cleaner depending on the direction in which the docking induction signal is received is reduced, and the robot cleaner docks with the charging device 1 showing an increasingly linear movement as the robot cleaner approaches the charging device 1.

Via the abovementioned docking induction, the power terminal of the robot cleaner comes into stable contact with the charging terminal 220 of the charging device 1.

The terminal supporting member 240, which is disposed at the lower side of the charging terminal 220, elastically supports the charging terminal 220 so that the power terminal and the charging terminal 220 can remain in tight contact with each other and the docked robot cleaner can be recharged stably.

When the recharging of the robot cleaner is completed and the robot cleaner is removed from the charging device 1 for such reasons as cleaning or storage, the strength of stability of the terminal supporting member 240 comes into play and the charging terminal 220 returns to the position of initial exposure.

The charging device according to the embodiment can reduce the transmission angle of the docking guide signal transmitted by the docking induction light emitting unit, and increase the accuracy with which the robot cleaner is docked with the charging device.

Also, at the terminal unit, the power terminal of the docked robot cleaner and the charging terminal of the charging device can remain in tight contact with each other because the charging terminal is elastically supported.

Therefore, the charging device according to the embodiment can charge the robot cleaner efficiently.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A charging device of a robot cleaner, the charging device comprising:

a main body comprising a terminal unit configured to charge the robot cleaner, the main body defining an appearance;

an induction signal generating unit disposed at a side of the main body to transmit a return induction signal to the robot cleaner; and an induction signal guide member disposed at a side of the induction signal generating unit to enhance docking performance of the robot cleaner by improving linearity of the return induction signal by limiting a transmission angle of the return induction signal transmitted by the induction signal generating unit, wherein the induction signal generating unit comprises at least one docking induction light emitting unit to guide the robot cleaner to a docking position by transmitting a docking induction signal, wherein the induction signal guide member comprises a guide which is opened at a front side and surrounds at least both sides of the at least one docking induction light emitting unit, and first and second [reflections] *reflection* units are extended from the guide to block the docking induction signal and spaced apart from each other, and wherein an extended direction of the first and second reflection units crosses a direction of transmitting the docking induction signal.

2. The charging device according to claim 1, wherein the induction signal generating unit further comprises at least a pair of access induction light emitting units to transmit the return induction signal for guiding the robot cleaner to a return position, and the at least a pair of access induction light emitting units are disposed outside the guide.

3. The charging device according to claim 2, wherein the induction signal guide member improves linearity of the docking induction signal by restricting a transmission angle of the signal transmitted from the at least one docking induction light emitting unit.

4. The charging device according to claim 1, wherein the first and second reflection units protrude from both inner sides of the guide to face each other, a space between the first and second reflection units facing each other being disposed on the same line as the at least one docking induction light emitting unit.

5. The charging device according to claim 1, wherein an end of each of the first and second reflection unit slopes.

6. The charging device according to claim 1, wherein a surface of each of the first and second reflection units which is toward the at least one docking induction light emitting unit has a shorter projection length than a surface of each of the first and second reflection units which is toward the opened front side of the guide.

7. The charging device according to claim 1, wherein the end of each of the first and second reflection units slopes toward the opened front side.

*8. A charging device of a robot cleaner, the charging device comprising:*

*a main body comprising a terminal unit to charge the robot cleaner, the main body defining an appearance;*

*an induction signal generating unit disposed at a side of the main body to transmit a return induction signal to the robot cleaner; and*

*an induction signal guide member disposed at a side of the induction signal generating unit to enhance docking performance of the robot cleaner by improving linearity of the return induction signal,*

*wherein the induction signal generating unit comprises a docking induction light emitting unit to guide the robot cleaner to a docking position by transmitting a docking induction signal,*

*wherein the induction signal guide member comprises:*

*a guide having an opening at a front side, the guide surrounding sides of the docking induction light emitting unit, and*

*first and second reflection units which are extended from the guide facing each other and are spaced apart from each other to partially block the docking induction signal by limiting a transmission angle of the docking induction signal transmitted by the induction signal generating unit, and*

*wherein an extended direction of the first and second reflection units crosses a direction of transmitting the docking induction signal.*

*9. The charging device according to claim 8, wherein the first and second reflection units and the opening constitute a front surface of the guide.*

*10. The charging device according to claim 8, wherein the induction signal generating unit further comprises:*

*at least a pair of access induction light emitting units to transmit the return induction signal for guiding the robot cleaner to a return position,*

*wherein the at least a pair of access induction light emitting units are disposed outside the guide.*

*11. The charging device according to claim 10, wherein the induction signal guide member is disposed between the at least a pair of access induction light emitting units.*

*12. The charging device according to claim 8, wherein an end of each of the first and second reflection units slopes.*

*13. The charging device according to claim 8, wherein a surface of each of the first and second reflection units which*

*is toward the docking induction light emitting unit has a shorter projection length than a surface of each of the first and second reflection units which is toward the front side opening of the guide.*

* * * * *